US007111835B2

(12) United States Patent
Nagai et al.

(10) Patent No.: US 7,111,835 B2
(45) Date of Patent: Sep. 26, 2006

(54) CLAMP APPARATUS

(75) Inventors: Shigekazu Nagai, Adachi-ku (JP); Akio Saitoh, Kawaguchi (JP); Motoshi Togasaki, Kasukabe (JP); Kazuyuki Oguma, Moriya-machi (JP)

(73) Assignee: SMC Kabushiki Kaisha, Tokyo (JP)

( * ) Notice: Subject to any disclaimer, the term of this patent is extended or adjusted under 35 U.S.C. 154(b) by 465 days.

(21) Appl. No.: 10/674,518

(22) Filed: Oct. 1, 2003

(65) Prior Publication Data

US 2004/0071563 A1 Apr. 15, 2004

(30) Foreign Application Priority Data

Oct. 10, 2002 (JP) .................................... 2002-297951
Oct. 10, 2002 (JP) .................................... 2002-297989

(51) Int. Cl.
*B23Q 3/08* (2006.01)

(52) U.S. Cl. ........................ 269/32; 269/228; 269/27

(58) Field of Classification Search .................. 269/32, 269/20, 228, 24–27, 201, 47–50; 279/2.06, 279/2.09

See application file for complete search history.

(56) References Cited

U.S. PATENT DOCUMENTS 4,529,362 A 7/1985 Ichiryu et al.
6,102,383 A * 8/2000 Tunkers ..................... 269/24
6,471,199 B1 10/2002 Nagai et al.
6,543,223 B1 4/2003 Muschong et al.
6,641,123 B1 * 11/2003 Takahashi .................. 269/32
2004/0071563 A1 * 4/2004 Nagai et al. ............... 417/271

FOREIGN PATENT DOCUMENTS

DE 100 13 194 9/2001
JP 2001-310225 11/2001

* cited by examiner

*Primary Examiner*—Lee D. Wilson
(74) *Attorney, Agent, or Firm*—Paul A. Guss

(57) ABSTRACT

A clamp apparatus has a lower body. A rotary driving source driven by an electric signal, a pump mechanism having a pressure oil-sucking/discharging mechanism energized/deenergized by the rotary driving source, a cylinder mechanism provided with a piston for moving in an axial direction in accordance with supply of pressure oil, and an accumulator for retaining the pressure oil are integrally assembled to the lower body.

9 Claims, 10 Drawing Sheets

CLAMP APPARATUS

BACKGROUND OF THE INVENTION

1. Field of the Invention

The present invention relates to a clamp apparatus capable of clamping a workpiece which is positioned on a carriage and transported in an automatic assembly line.

2. Description of the Related Art

Workpieces of engines are transported by carriages, for example, in automatic assembly lines for manufacturing automobiles. A variety of machining steps and assembling steps are performed at respective stations.

At each of the stations, it is necessary to position the workpiece in order to fix on a jig. Recently, a clamp apparatus is provided on the carriage itself. The workpiece is transported while clamped on the carriage. Only the carriage is positioned at each of the stations.

In this system, for example, a rotary driving source such as a motor is used as a driving source for the clamp apparatus.

In the clamp apparatus, the rotary driving source produces the rotary driving force which is transmitted to a ball screw by a gear mechanism. The rotary driving source is provided integrally with a body and is driven by an electric signal. The rotary driving force is converted into the rectilinear motion of the ball screw which is displaceable in the axial direction in accordance with the rotation in the body. The rectilinear motion of the ball screw is transmitted to a toggle link mechanism by a knuckle joint. A clamp arm is rotated by the rotary action of a support lever of the toggle link mechanism so that the workpiece is clamped. Accordingly, the clamping force of the clamp arm is applied by the rotary driving force of the rotary driving source (see, for example, Japanese Laid-Open Patent Publication No. 2001-310225).

In the conventional clamp apparatus, the driving force produced only by the rotary driving source is used to displace the ball screw rectilinearly by rotating the gear mechanism, to transmit the driving force to the toggle link mechanism through the knuckle joint by the displacement of the ball screw, and to rotate the clamp arm for clamping the workpiece by rotating the support lever of the toggle link mechanism. Therefore, a large driving load may be exerted on the rotary driving source. In other words, the driving load exerted on the rotary driving source is large, because all of the motions of the components depend on the driving force of the rotary driving source.

The gear mechanism comprises a plurality of gears which are meshed with each other, for transmitting the rotary driving force of the rotary driving source to the ball screw. Therefore, the body, in which the gear mechanism is accommodated, tends to be large in width. For this reason, it is preferable if the entire apparatus is miniaturized by decreasing the width of the body.

Further, the conventional clamp apparatus requires, for example, a DC power source or an AC power source for supplying the DC or AC current in order to drive the rotary driving source. It is sometimes difficult to install the DC power source or the AC power source depending on the environment of use of the clamp apparatus.

Further, in the conventional clamp apparatus, wiring operation to connect the rotary driving source to the DC power source or the AC power source is complicated even when the DC power source or the AC power source can be installed in the environment.

SUMMARY OF THE INVENTION

A general object of the present invention is to provide a clamp apparatus which makes it possible to miniaturize the entire apparatus by integrally providing a rotary driving section, a pump mechanism, and a retaining mechanism in a main body.

A principal object of the present invention is to provide a clamp apparatus which makes it possible to dispense with any external electric power and any external wiring.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
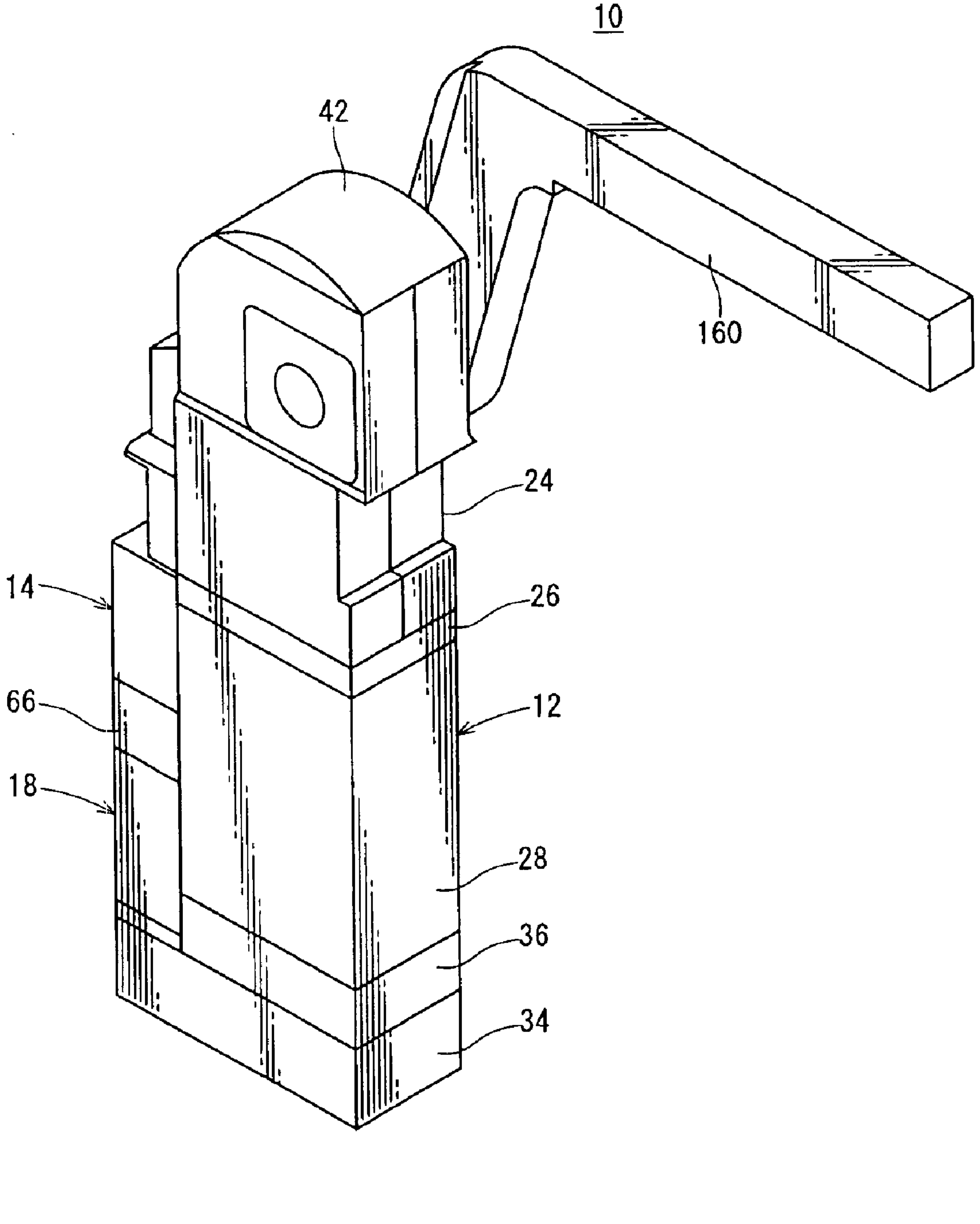
FIG. 1 is a perspective view illustrating a clamp apparatus according to an embodiment of the present invention.
Figure 2:
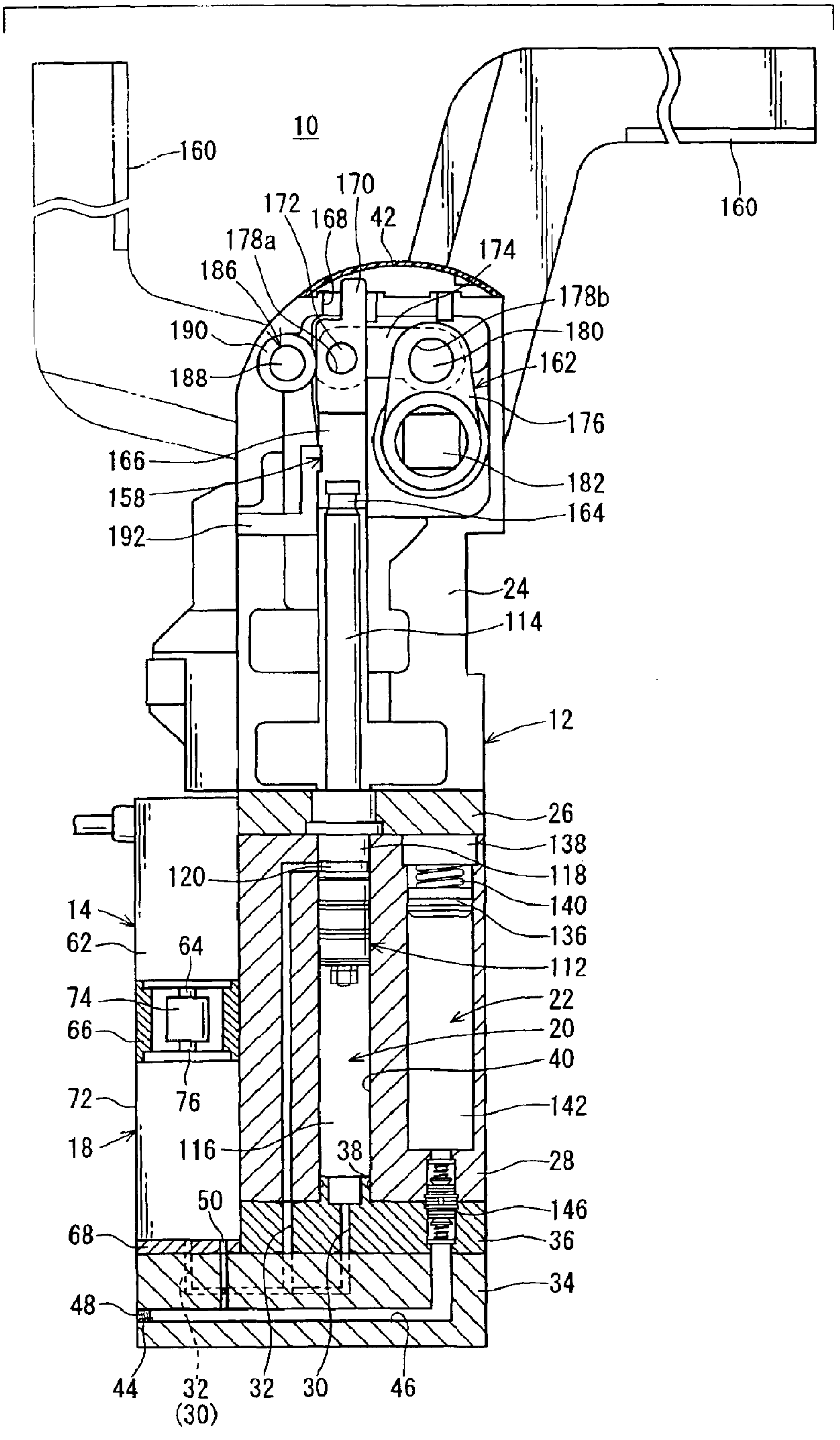
FIG. 2 is a partial vertical sectional view taken along the axial direction of the clamp apparatus shown in FIG. 1.

With reference to FIGS. 1 and 2, reference numeral 10 indicates a clamp apparatus according to an embodiment of the present invention.

The clamp apparatus 10 comprises a flat body 12 which has a narrow width, a rotary driving section 14 which is integrally connected to the side of the body 12, a pump mechanism 18 provided under the rotary driving section 14 and having a pressure oil-sucking/discharging mechanism 16 (see FIG. 3) that is energized/deenergized by the rotary driving section 14, a cylinder mechanism (driving force-transmitting mechanism) 20 provided at a substantially central portion of the body 12 and having a piston 112 and a piston rod 114 that are displaceable in the axial direction when the pressure oil is supplied (as described later on), an accumulator (retaining mechanism) 22 provided in the body 12 and retaining a predetermined amount of the pressure oil, and a toggle link mechanism 162 for converting the rectilinear motion of the piston rod 114 driven by the cylinder mechanism 20 into the rotary action of a clamp arm 160 as described later on.

The body 12 includes a flat upper body 24, a flat lower body 28 integrally connected to the lower side of the upper body 24 with a spacer body 26 interposing between the upper body 24 and the lower body 28, an end body 34 integrally connected to a lower portion of the lower body 28 and having first and second fluid passages 30, 32 formed therein to flow the pressure oil therethrough, and a connecting body 36 interposed between the end body 34 and the lower body 28.

A projection 38 is formed on the upper surface of the connecting body 36, and protrudes upwardly by a predetermined length. The projection 38 is inserted into a through-hole 40 which is formed at a substantially central portion of the lower body 28. A cover member 42 is installed to the top of the upper body 24 as described later on.

A charge port 44 is formed in the side of the end body 34, and the pressure oil is supplied to the charge port 44 via an unillustrated pipe from an unillustrated external pressure oil supply source. The charge port 44 is communicated with a supply passage 46 which is formed substantially horizontally in the end body 34.

A plug member 48 is installed to the charge port 44 to close the charge port 44 after supplying the pressure oil. The pressure oil is prevented from any leakage to the outside through the charge port 44 by the plug member 48.

A branched passage 50 extends substantially perpendicularly from the supply passage 46 disposed in the end body 34. The branched passage 50 is branched toward the pump mechanism 18 and is communicated with a pressure oil-charging chamber 70 of the pump mechanism 18 as described later on.

Figure 3:
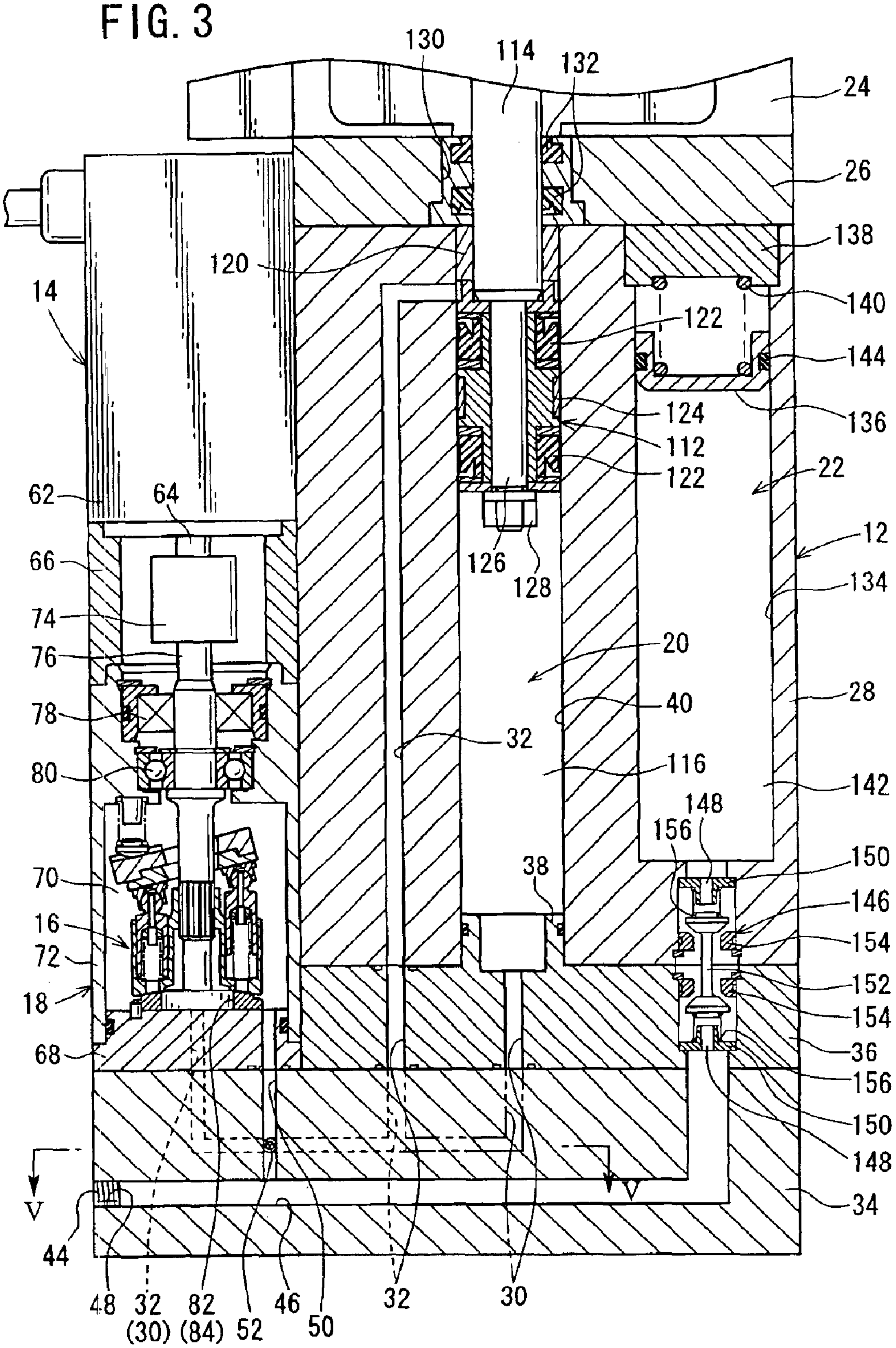
FIG. 3 is, with partial omission, a magnified vertical sectional view illustrating the inside of a lower body which constitutes the clamp apparatus shown in FIG. 1.

As shown in FIG. 3, the first fluid passage 30 formed in the end body 34 has one end communicated with a first port 82 of the pump mechanism 18 as described later on and the other end communicated with a first cylinder chamber 116 of the cylinder mechanism 20 as described later on.

The second fluid passage 32 is substantially in parallel to the first fluid passage 30 while being spaced from the first fluid passage 30 by a predetermined distance. The second fluid passage 32 has one end communicated with a second port 84 of the pump mechanism 18 as described later on and the other end communicated with the side surface of a second cylinder chamber 120 of the cylinder mechanism 20 through the inside of the lower body 28 as described later on.

Figure 5:
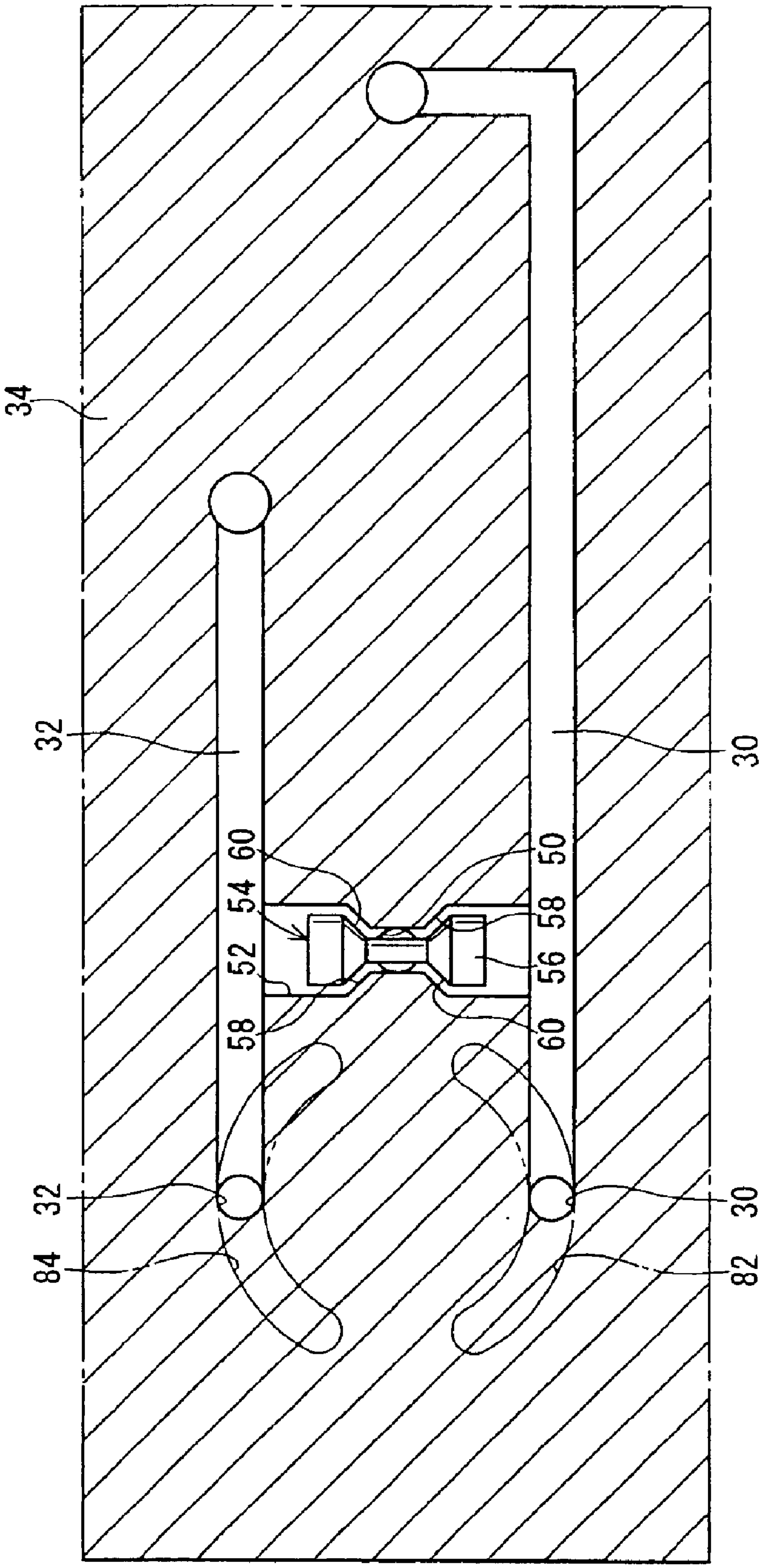
FIG. 5 is a lateral sectional view taken along a line V—V shown in FIG. 3.

As shown in FIG. 5, the first and second fluid passages 30, 32 formed in the end body 34 are communicated with each other by a bypass passage 52 which is substantially perpendicularly to the first and second fluid passages 30, 32.

A shuttle valve 54 is provided in the bypass passage 52, and is displaceable in the axial direction of the bypass passage 52. The shuttle valve 54 comprises a valve plug 56 which is arranged at a substantially central portion along the axis of the bypass passage 52 and which has a substantially I-shaped cross section, and a pair of seat sections 58 which are formed by the bypass passage 52 with reduced inner diameters in tapered forms. Tapered surfaces 60 are opposed to the seat sections 58 of the valve plug 56, and are inclined by substantially the same angles as those of the seat sections 58.

Thus, when the pressure oil flowing through one of the first fluid passage 30 and the second fluid passage 32 has an oil pressure higher than the other, the shuttle valve 54 is pressed toward the passage in which the oil pressure is lower, in accordance with the difference in pressure of the pressure oil. The shuttle valve 54 is seated on the seat section 58 at the tapered surface 60 when the shuttle valve 54 is displaced. Therefore, the pressure oil does not flow from the fluid passage having the higher oil pressure to the fluid passage having the lower oil pressure. It is possible to shut off the communication of the pressure oil flowing through the bypass passage 52. The branched passage 50 is communicated with the bypass passage 52 substantially perpendicularly at substantially the central portion of the bypass passage 52.

On the other hand, the volume of the pressure oil to be supplied differs between the first cylinder chamber 116 and the second cylinder chamber 120 of the cylinder mechanism 20. Specifically, the piston rod 114 is always inserted into the second cylinder chamber 120, as compared with the first cylinder chamber 116. Therefore, the volume of the second cylinder chamber 120 is smaller than that of the first cylinder chamber 116. Accordingly, it is necessary to adjust the flow rate of the pressure oil discharged from the pump mechanism 18 and supplied to the first cylinder chamber 116 via the first fluid passage 30 and the flow rate of the pressure oil discharged from the pump mechanism 18 and supplied to the second cylinder chamber 120 via the second fluid passage 32.

That is, when the pressure oil is supplied to the first fluid passage 30, the valve plug 56 is seated on one seat section 58 to retain the oil pressure of the pressure oil to be supplied to the first cylinder chamber 116. When the pressure oil is supplied to the second fluid passage 32, the valve plug 56 is prevented from being seated on the other seat section 58 until a predetermined oil pressure previously set based on the volume of the second cylinder chamber 120. Accordingly, part of the pressure oil through the second fluid passage 32 flows to the first fluid passage 30 by the open shuttle valve 54. Therefore, it is possible to adjust the flow rate of the pressure oil to be supplied to the second cylinder chamber 120.

The rotary driving section 14, which is integrally provided on the side of the lower body 28, has a rotary driving source 62 which is, for example, a DC motor including a brushless motor or a step motor. The rotary driving source 62 is driven and rotated when an electric signal is inputted from an unillustrated power source. A drive shaft 64 is provided at a lower portion of the rotary driving source 62 so that the drive shaft 64 protrudes downwardly. The drive shaft 64 is rotated together with the rotary driving source 62 when the rotary driving source 62 is rotated (see FIG. 3).

As shown in FIG. 3, the pump mechanism 18 comprises a casing 72 which is integrally connected to a lower portion of the rotary driving section 14 with a spacer member 66 interposing therebetween and which has the pressure oil-charging chamber 70 provided therein and tightly sealed by an end plate 68, a rotary shaft 76 which is coaxially connected to the drive shaft 64 of the rotary driving source 62 via a coupling member 74 arranged in the spacer member 66 and which penetrates through the pressure oil-charging chamber 70 provided in the casing 72, and the pressure oil-sucking/discharging mechanism 16 which is rotatable together with the rotary shaft 76 when the rotary shaft 76 is rotated.

Figure 4:
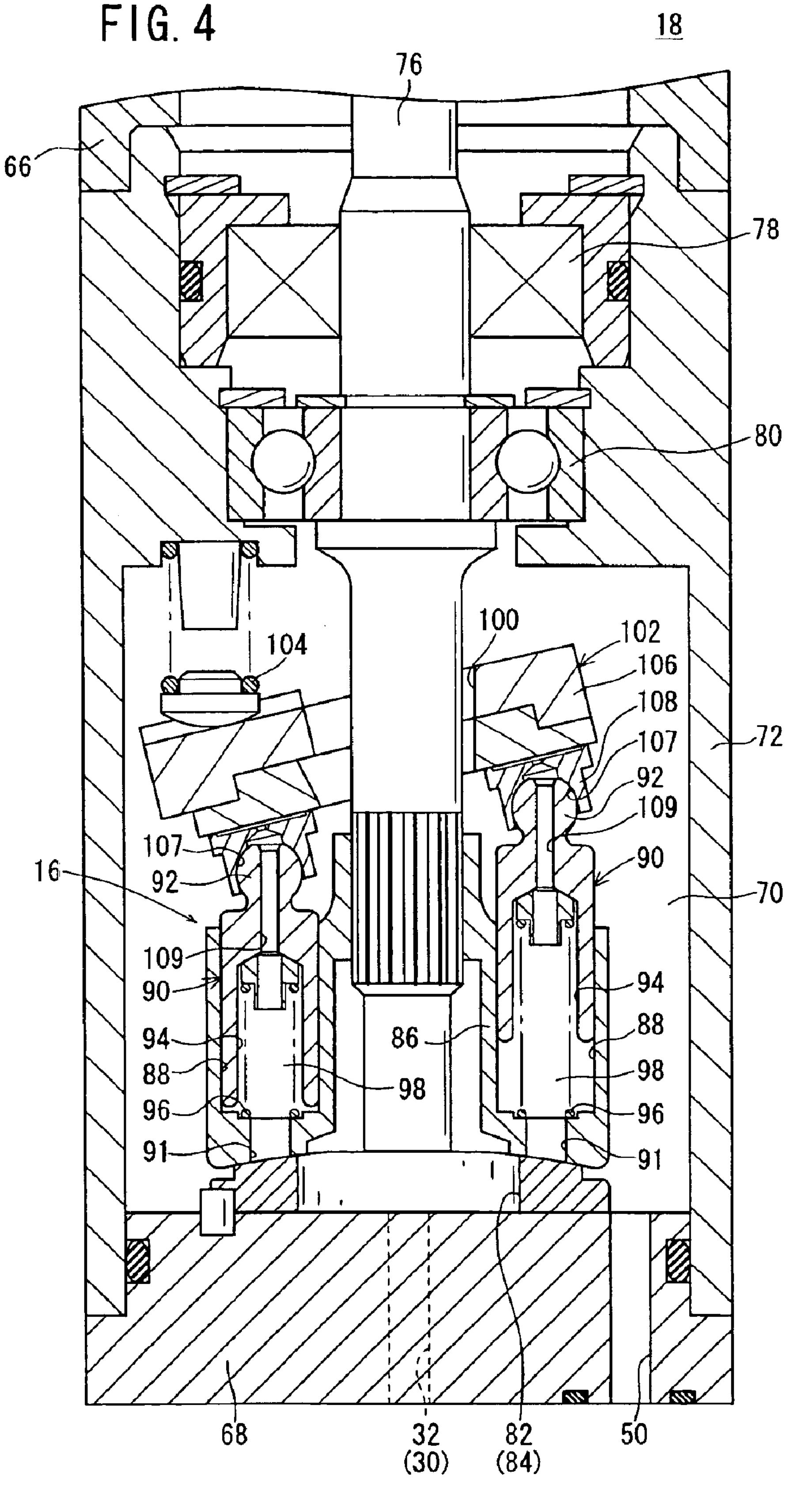
FIG. 4 is a magnified vertical sectional view illustrating a pump mechanism shown in FIG. 3.

As shown in FIG. 4, one end of the rotary shaft 76 disposed closely to the drive shaft 64 of the rotary driving source 62 is rotatably supported by a first bearing 78 and a second bearing 80 which are provided in an aligned manner in the casing 72. The other end of the rotary shaft 76 is rotatably supported by an unillustrated bearing which is arranged in the end plate 68.

In the end plate 68, the first and second ports 82, 84 have circular arc-shaped configurations while being spaced from each other by a predetermined distance (see FIG. 5). The pressure oil sucked/discharged by the pressure oil-sucking/discharging mechanism 16 flows through the first and second ports 82, 84. The first and second ports 82, 84 are communicated with the first and second fluid passages 30, 32 formed in the end body 34, respectively.

As shown in FIG. 4, the pressure oil-sucking/discharging mechanism 16 includes a cylinder block 86 which is spline-fitted (or fitted by a splined portion) to an intermediate portion of the rotary shaft 76 and which is rotatable together with the rotary shaft 76, a plurality of holes 88 which are arranged so that the holes 88 are spaced from each other by predetermined angles circumferentially around the cylinder block 86, a plurality of pump pistons 90 which are provided displaceably in parallel to the axis of the rotary shaft 76 and which slide along the holes 88 of the cylinder block 86, and pressure oil holes 91 which are formed through the lower surface of the cylinder block 86 and which are communicated with the hole 88.

Each of the pump pistons 90 is provided with a spherical surface section 92 having a spherical form and a recess 94 cut out inwardly. A spring member 96 is interposed between the recess 94 of the pump piston 90 and the bottom surface of the hole 88 of the cylinder block 86. The pump piston 90 is always urged upwardly by the spring force of the spring member 96. A chamber 98 is defined and closed by the hole 88 of the cylinder block 86 and the recess 94 of the pump piston 90. The chamber 98 functions as a pressure oil-sucking chamber and a pressure oil-discharging chamber as described later on.

The pressure oil-sucking/discharging mechanism 16 further comprises a tiltable member 102 which is provided in non-contact with the rotary shaft 76 owing to the presence of a through-hole 100 and which is provided tiltably by an unillustrated pin axially attached to the casing 72, and a spring member 104 which presses a part of the tiltable member 102 downwardly. The tiltable member 102 and the spring member 104 function to adjust the suction amount and the discharge amount.

The tiltable member 102 comprises a disk section 106, and a retaining section 108 which is secured to the bottom surface of the disk section 106 and which has an annular groove 107 for receiving the spherical surface sections 92 of the plurality of pump pistons 90. The tiltable member 102 is inclined by a predetermined angle with respect to the horizontal surface by means of the spring force of the spring member 104. The lubrication is retained by the pressure oil flowing through a communication passage 109 communicated with the recesses 94, for sliding portions of the spherical surface sections 92 with respect to the annular groove 107.

The through-hole 40 disposed in the axial direction is formed at the substantially central portion of the lower body 28. The cylinder mechanism 20 is arranged in the through-hole 40.

As shown in FIG. 3, the cylinder mechanism 20 comprises the piston 112 which is provided insertably in the axial direction into the through-hole 40, and the elongate piston rod 114 which has one end integrally connected to the piston 112 and the other end facing the toggle link mechanism 162 as described later on.

The projection 38 protruding upwardly by the predetermined length from the connecting body 36 is inserted into the lower portion of the through-hole 40. The first cylinder chamber 116 is formed between the projection 38 and the lower surface of the piston 112.

Similarly, the second cylinder chamber 120 is formed between the upper surface of the piston 112 disposed in the through-hole 40 and the end block 118 inserted into the upper portion of the through-hole 40 (see FIG. 2).

The first cylinder chamber 116 is communicated with the first port 82 of the pump mechanism 18. Further, the first cylinder chamber 116 is communicated with the first fluid passage 30 formed in the connecting body 36 and the end body 34. The pressure oil in the first cylinder chamber 116 is supplied/discharged via the first fluid passage 30.

The second cylinder chamber 120 is communicated with the second port 84 of the pump mechanism 18. Further, the second cylinder chamber 120 is communicated with the second fluid passage 32 formed in the lower body 28, the connecting body 36 and the end body 34. The pressure oil in the second cylinder chamber 120 is supplied/discharged via the second fluid passage 32.

As shown in FIG. 3, a pair of piston packings 122 are installed to annular grooves on the outer circumferential surface of the piston 112 near the first cylinder chamber 116 and near the second cylinder chamber 120, respectively. The piston packings 122 abut against the inner wall surface of the through-hole 40 to retain the liquid tightness of the first cylinder chamber 116 and the second cylinder chamber 120. A wear ring 124 is installed to an annular groove at a substantially central portion of the outer circumferential surface in the axial direction of the piston 112.

A diametrally reduced section 126 is formed at a lower portion of the lengthy piston rod 114, and is inserted into a substantially central portion along the axis of the piston 112. One end of the piston rod 114 protruding from the lower surface of the piston 112 is screwed with a nut 128 to be connected with the piston 112 integrally.

The piston rod 114 is provided insertably in the end block 118 which is installed to the upper portion of the through-hole 40. The outer circumferential surface of the piston rod 114 is surrounded by rod packings 132 which are provided in a hole 130 of the spacer body 26. As a result, the liquid tightness is retained in the second cylinder chamber 120.

A hole 134 is formed in the lower body 28, and is disposed in the axial direction while being spaced radially outwardly by a predetermined distance from the cylinder mechanism 20. The accumulator 22 is provided in the hole 134. The pressure oil supplied from the charge port 44 of the end body 34 is supplied via the supply passage 46 and stored in the accumulator 22.

As shown in FIGS. 2 and 3, the accumulator 22 comprises an accumulator piston 136 which is provided displaceably in the axial direction in the hole 134, a spring 140 which is interposed between a closing member 138 for closing the upper portion of the hole 134 and the upper surface of the accumulator piston 136 and which urges the accumulator piston 136 downwardly by the spring force, and a charging chamber 142 which is surrounded by the lower surface of the accumulator piston 136 and the hole 134 and which is filled with the pressure oil via the supply passage 46 of the end body 34. A seal member 144 is installed to an annular groove on the outer circumferential surface of the accumulator piston 136. That is, the accumulator piston 136 is displaceable upwardly against the spring force of the spring 140 when pressed by the pressure oil supplied into the charging chamber 142.

The charging chamber 142 is communicated with the supply passage 46 which is formed in the end body 34, the connecting body 36, and the lower body 28. A valve 146, which is capable of cutting off the pressure oil flowing through the supply passage 46, is installed to the lower portion of the charging chamber 142 so that the valve 146 is interposed between the connecting body 36 and the lower body 28.

As shown in FIG. 3, the valve 146 includes connecting members 150 which are installed to the connecting body 36 and the lower body 28 respectively and which are formed with communication passages 148 for flowing the pressure oil, a valve plug 152 which is provided displaceably in the axial direction in the valve 146, valve seat sections 154 which cut off the flow of the pressure oil through the supply passage 46 when the valve plug 152 is seated thereon, and spring members 156 which are interposed between the connecting members 150 and the valve plug 152 and which urge the valve plug 152 in the directions to separate from the connecting members 150.

That is, when the pressure oil is supplied from the supply passage 46 disposed near the end body 34, the valve plug 152 is pressed upwardly against the spring force of the spring member 156 by the pressure oil. Accordingly, the pressure oil is supplied to the valve 146 via the communication passage 148. Further, the pressure oil is supplied to the charging chamber 142 of the accumulator 22 from the inside of the valve 146 via the communication passage 148 of the connecting member 150 installed to the lower body 28.

Reversely, when the pressure oil, which has been supplied in the accumulator 22, is discharged to the supply passage 46, the pressure oil flows into the valve 146 via the communication passage 148 from the supply passage 46 of the lower body 28 by pressing the valve plug 152 downwardly against the spring force of the spring member 156 by the pressure oil. The pressure oil flows into the supply passage 46 of the end body 34 from the inside of the valve 146 via the communication passage 148 of the connecting member 150 installed to the connecting body 36.

As shown in FIG. 2, the upper portion of the piston rod 114 is inserted into the upper body 24. The toggle link mechanism 162 is provided at the other end of the piston rod 114, for converting the rectilinear motion of the piston rod 114 into the rotary motion of the clamp arm 160 by a knuckle joint 158.

The knuckle joint 158 comprises a knuckle pin 164 which has a substantially T-shaped cross section and which is connected to one end of the piston rod 114, and a knuckle block 166 which has a bifurcated section with two branches for engaging with the head of the knuckle pin 164.

A release projection 170 is integrally formed at the upper portion of the knuckle block 166, and slightly protrudes from an opening of the upper body 24. The cover member 42 formed of a flexible material such as rubber is installed to the upper body 24, for example. When the release projection 170 is pressed downwardly over the cover member 42, locked state can be released manually.

As shown in FIG. 2, the toggle link mechanism 162 includes a link plate 174 which is connected to the upper portion of the knuckle block 166 by a first pin member 172, and a support lever 176 which is rotatably supported by a pair of substantially circular openings (not shown) formed through the upper body 24.

The link plate 174 is interposed between the knuckle block 166 and the support lever 176, and the link plate 174 functions to link the knuckle joint 158 and the support lever 176. That is, the link plate 174 is formed with a pair of holes 178*a*, 178*b* which are spaced from each other by a predetermined distance. The link plate 174 is connected to the knuckle block 166 by a first pin member 172 which is pivotably attached to the hole 178*a*. The link plate 174 is connected to the support lever 176 by a second pin member 180 which is pivotably attached to the other hole 178*b*.

The support lever 176 includes bearing sections 182 which have rectangular cross sections, which protrude in directions substantially perpendicular to the axis of the piston rod 114, and which are exposed from the upper body 24 through the unillustrated openings. The clamp arm 160 is detachably installed to the bearing section 182 in order to clamp an unillustrated workpiece. In this arrangement, the support lever 176 is rotated together with the clamp arm 160.

The rectilinear motion of the piston rod 114 is transmitted to the support lever 176 via the knuckle joint 158 and the link plate 174. The support lever 176 is rotatable by a predetermined angle about the center of rotation of the bearing sections 182 protruding from the pair of openings (not shown) formed through the upper body 24.

An unillustrated guide groove, which guides the knuckle block 166, is formed on the inner wall surface of the upper body 24 so that the guide groove extends in the vertical direction. A recess 184 having a substantially semicircular cross section is formed at an upper portion of the inner wall surface of the upper body 24. A needle roller 186 is provided in the recess 184, and is rotatable in accordance with engagement with a circular arc-shaped side surface of the link plate 174. The needle roller 186 comprises a pin member 188 which is fixed to the upper body 24, a ring-shaped roller 190 which is rotatable in a predetermined direction about the center of rotation of the pin member 188, and a plurality of needles (not shown) which are arranged circumferentially between the outer circumferential surface of the pin member 188 and the inner circumferential surface of the roller 190.

An unillustrated metal component to be detected is connected to the knuckle block 166 by a dog 192. A pair of unillustrated sensors are provided on the outer side surface disposed on the upper side, for sensing the position of the metal component by utilizing the change of the impedance when the metal component approaches. The position of rotation of the clamp arm 160 can be detected by sensing the metal component by one of the unillustrated sensors.

Figure 6:
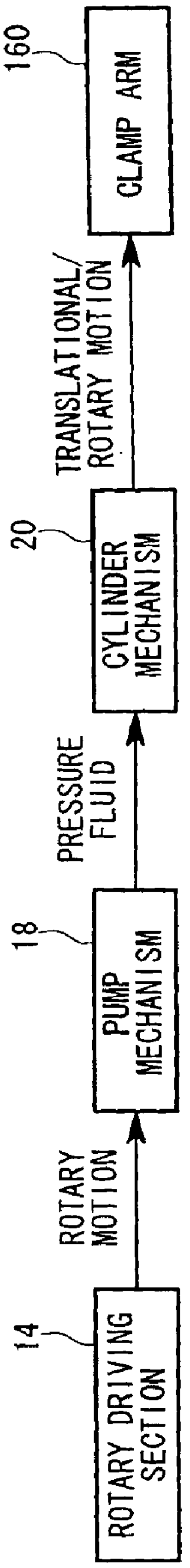
FIG. 6 is a block diagram illustrating the operation of the clamp apparatus shown in FIG. 1.
Figure 7:
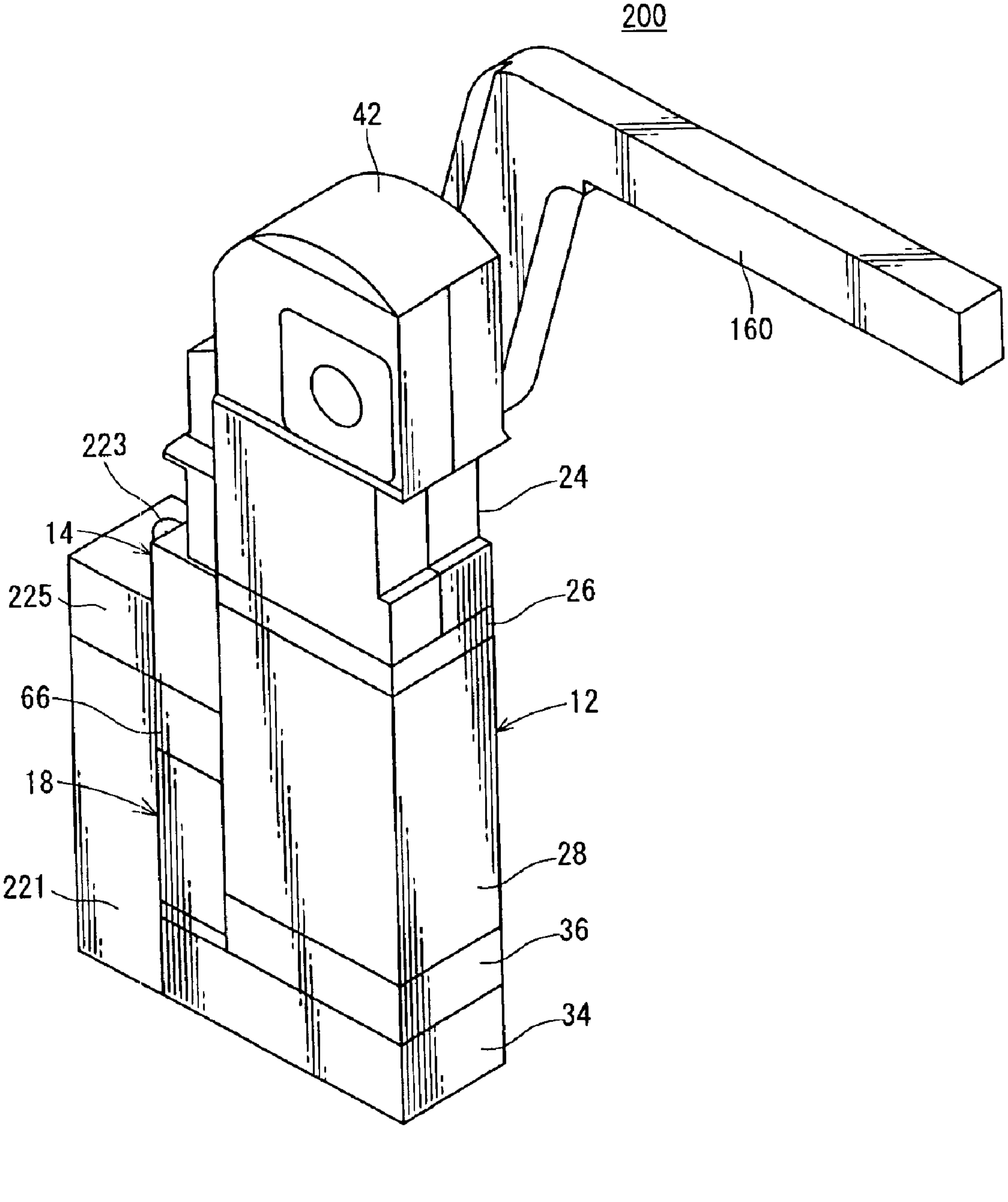
FIG. 7 is a perspective view illustrating a clamp apparatus according to another embodiment of the present invention.
Figure 8:
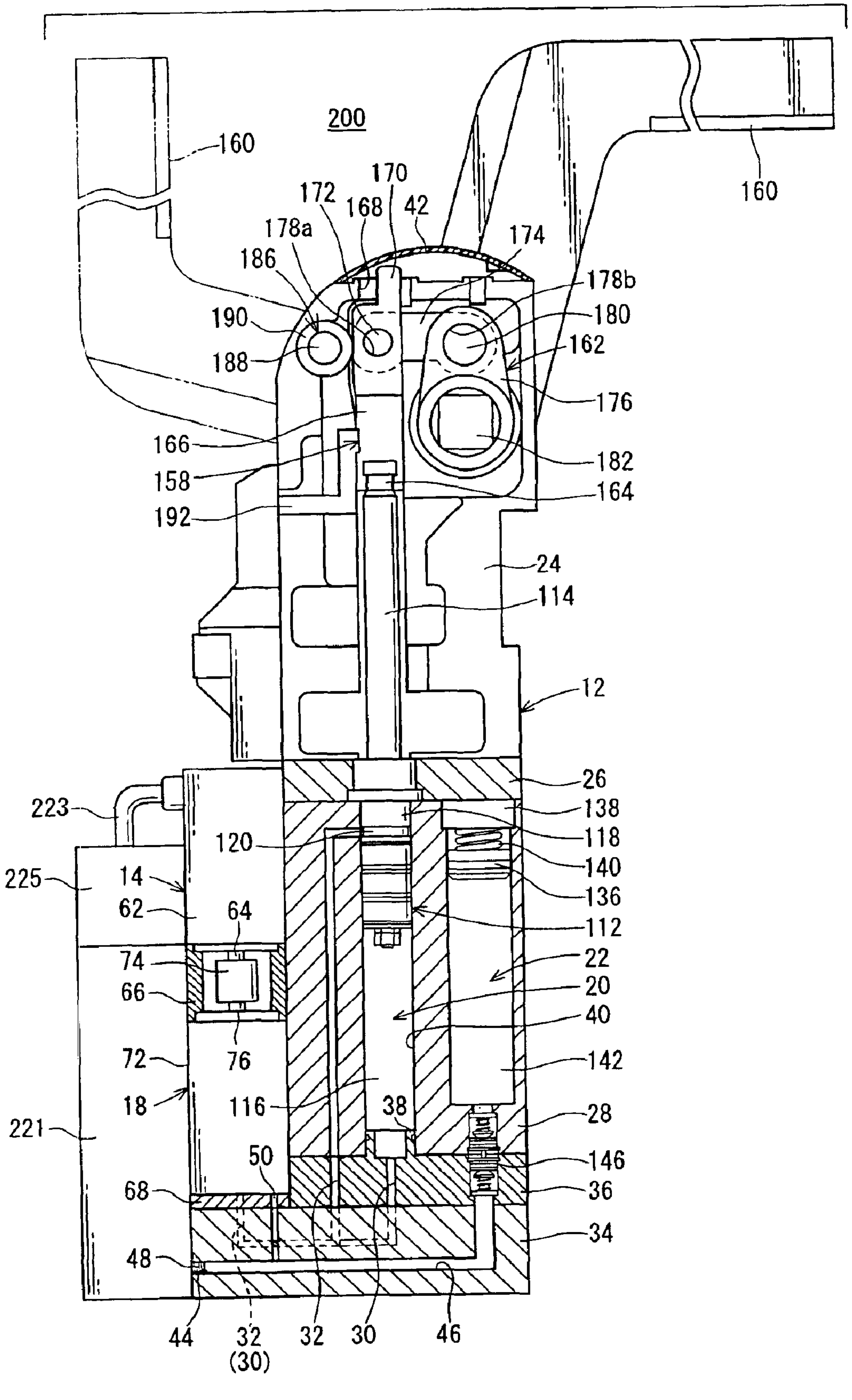
FIG. 8 is a partial vertical sectional view taken along the axial direction of the clamp apparatus shown in FIG. 7.
Figure 9:
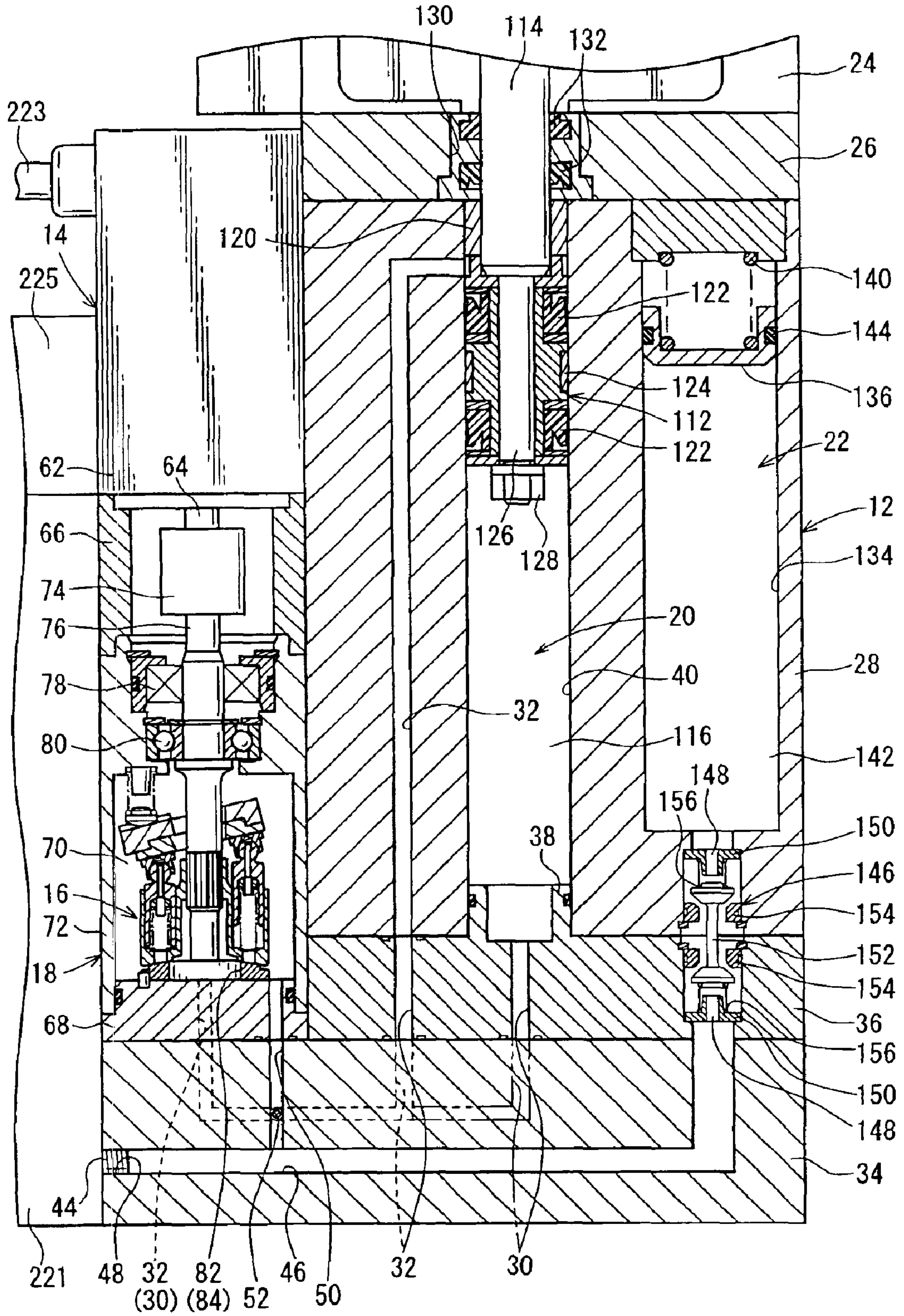
FIG. 9 is, with partial omission, a magnified vertical sectional view illustrating the inside of a lower body which constitutes the clamp apparatus shown in FIG. 7.
Figure 10:
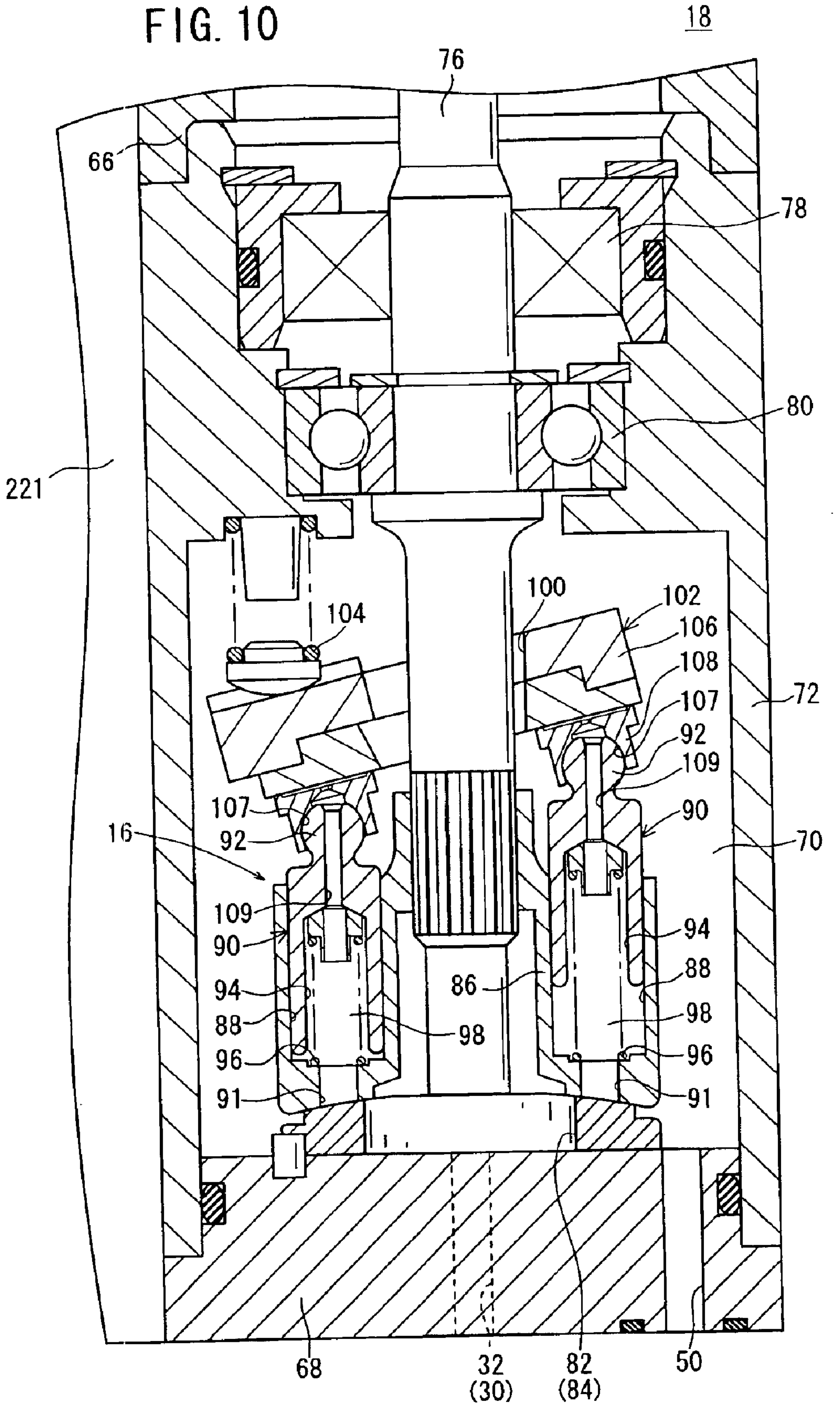
FIG. 10 is a magnified vertical sectional view illustrating a pump mechanism shown in FIG. 9.

The clamp apparatus 10 according to the embodiment of the present invention is basically constructed as described above. Next, its operation, function, and effect will be explained with reference to FIG. 6.

The clamp apparatus 10 is fixed to a predetermined position by an unillustrated fixing mechanism. The following description is made assuming that in its initial position the clamp arm 160 is released as shown by two-dot chain lines in FIG. 2 (unclamped state).

Firstly, the unillustrated pressure oil supply source is connected to the charge port 44 of the end body 34. The pressure oil is fed from the charge port 44 via the supply passage 46, and the pressure oil is supplied to the charging chamber 142 of the accumulator 22 via the valve 146.

Further, the pressure oil is supplied to the pressure oil-charging chamber 70 of the pump mechanism 18 via the valve 146, the supply passage 46, and the branched passage 50.

In the initial position, after preparation as described above, the unillustrated power source is energized to drive and rotate the rotary driving source 62. The rotary shaft 76 of the pump mechanism 18 is connected to the drive shaft 64 by the coupling member 74. The rotary shaft 76 is rotated together with drive shaft 64 when the rotary driving source 62 is rotated.

The spline-fitted cylinder block 86 is rotated together with the rotary shaft 76 when the rotary shaft 76 is rotated. The pump pistons 90, which are provided displaceably in the holes 88 of the cylinder block 86, are rotated about the center of the rotary shaft 76. Further, the spherical surface sections 92 of the pump pistons 90 are displaced in the axial direction by the spring force of the spring members 96 while the spherical surface sections 92 are retained in the annular grooves 107 of the retaining section 108 of the tiltable member 102.

In this situation, the chamber 98 surrounded by the pump piston 90 and the hole 88 is filled with the pressure oil. Therefore, when the pump piston 90 is displaced to the bottom dead center at the lowermost position by the pressing action of the tiltable member 102, the pressure oil in the chamber 98 is discharged to the first port 82 via the pressure oil hole 91 by the downward displacement of the pump piston 90.

Reversely, when the pump piston 90 is displaced to the top dead center at the uppermost position by the spring force of the spring member 96, the pressure oil is sucked into the chamber 98 via the pressure oil hole 91 by the upward displacement of the pump piston 90.

Specifically, when the pump piston 90 is displaced to the position over the first port 82 (see FIG. 5) formed in the end plate 68, then the pump piston 90 is displaced to the bottom dead center at the lowermost position by the pressing action exerted by the tiltable member 102, and the pressure oil in the chamber 98 is discharged from the pressure oil hole 91. When the pump piston 90 is displaced to the position over the second port 84 (see FIG. 5), then the pump piston 90 is displaced to the top dead center at the uppermost position, and the pressure oil is sucked into the chamber 98 via the pressure oil hole 91. That is, the pump piston 90 is rotated about the center of the rotary shaft 76 while repeating the suction and the discharge of the pressure oil to and from the chamber 98 by repeating the displacement in the axial direction by the rotation of the rotary shaft 76.

The pressure oil discharged by the pump piston 90 as the discharging mechanism is supplied to the first fluid passage 30 via the first port 82 formed in the end plate 68. The pressure oil is supplied to the first cylinder chamber 116 of the cylinder mechanism 20 via the first fluid passage 30 of the end body 34 and the connecting body 36. The piston 112 is pressed upwardly by the pressure oil supplied to the first cylinder chamber 116, and also the piston rod 114 is moved upwardly together.

The displacement of the piston rod 114 in the axial direction is transmitted to the toggle link mechanism 162 by the knuckle joint 158, and is converted into the rotary action of the clamp arm 160 when the support lever 176 of the toggle link mechanism 162 is rotated.

That is, the knuckle joint 158 and the link plate 174 are pressed upwardly in accordance with the displacement of the piston rod 114 in the axial direction. The pressing force exerted on the link plate 174 rotates the link plate 174 by a predetermined angle about the support point of the first pin member 172. Further, the support lever 176 is rotated clockwise since the link plate 174 is linked with the support lever 176.

Therefore, the clamp arm 160 is rotated by a predetermined angle about the support points of the bearing sections 182 of the support lever 176. Accordingly, the clamp arm 160 clamps or grips the workpiece (clamped state).

In the clamped state, the pressure oil is continuously supplied to the first cylinder chamber 116 of the cylinder mechanism 20. Therefore, the clamping force to grip the workpiece with the clamp arm 160 is retained to be substantially constant.

When the piston 112 of the cylinder mechanism 20 arrives at the displacement end, the pressure of the pressure oil supplied to the first cylinder chamber 116 of the cylinder mechanism 20 is raised. In this state, the force (oil pressure) is generated to upwardly press the tiltable member 102 which is inclined by the predetermined angle. Then, the tiltable member 102 is tilted about the support point of the unillustrated pin against the spring force of the spring member 96 by the pressing force. Therefore, the angle of inclination of the tiltable member 102 is gradually decreased to a substantially horizontal state. Accordingly, the supply of the pressure fluid from the pressure oil-sucking/discharging mechanism 16 to the first cylinder chamber 116 is stopped. Thus, the pressure of the pressure oil supplied to the first cylinder chamber 116 is prevented from being excessively increased, and no excessive load is exerted on the pump mechanism 18 and the cylinder mechanism 20.

Next, in order to release the clamped state and obtain the unclamped state, the polarity of the current to be supplied to the rotary driving source 62 is reversed. Accordingly, the rotary shaft 76 of the pump mechanism 18, which is connected to the drive shaft 64 via the coupling member 74, is rotated reversely. Accordingly, contrary to the above, the pressure oil in the first fluid passage 30 is sucked by the displacement of the pump piston 90 of the pump mechanism 18. The pressure oil is discharged to the second fluid passage 32 via the second port 84 by the displacement of the pump piston 90.

Specifically, the pressure oil discharged to the second fluid passage 32 of the end body 34, the connecting body 36, and the lower body 28, is supplied to the second cylinder chamber 120 of the cylinder mechanism 20. Then, the oil pressure is raised in the second cylinder chamber 120. In this condition, the pressure oil in the first cylinder chamber 116 is discharged from the first fluid passage, and the pressure oil is returned into the pressure oil-charging chamber 70 through sucking by the pump piston 90 of the pump mechanism 18.

The piston 112 of the cylinder mechanism 20 is displaced downwardly by the pressing action of the pressure oil supplied to the second cylinder chamber 120. The piston rod 114 is moved downwardly by the displacement of the piston 112. Accordingly, the clamp arm 160 connected via the toggle link mechanism 162 is displaced in a direction to separate from the unillustrated workpiece.

In the embodiment of the present invention, the pump mechanism 18 for sucking and discharging the pressure oil, and the rotary driving source 62 for driving the pump mechanism 18 can be integrally provided on the side of the lower body 28. Further, the accumulator 22 for retaining the predetermined amount of the supplied pressure oil can be integrally provided in the lower body 28. Accordingly, it is possible to make the body small.

In the embodiment of the present invention, the rotary force of the rotary driving source 62 is converted into the feeding force of the pressure oil effected by the pump mechanism 18, and the piston rod 114 of the cylinder mechanism 20 is displaced in the axial direction by the fed pressure oil. Therefore, it is unnecessary to provide any gear mechanism which is used in a conventional clamp apparatus in order to transmit the rotary force of the rotary driving source 62. Accordingly, the gear mechanism is excluded and the dedicated space thereto is not necessary. It is possible to reduce the width of the body. Thus, it is possible to make the entire apparatus smaller.

In the embodiment of the present invention, the rotary action of the clamp arm 160 is effected by the cylinder mechanism 20 which is driven by the oil pressure. Therefore, the load exerted on the rotary driving source 62 is reduced, and the durability is improved. Further, the clamp arm 160 for clamping the unillustrated workpiece is driven by the oil pressure force. Therefore, it is possible to increase the clamping force for clamping the workpiece.

In the embodiment of the present invention, when the oil pressure of the pressure oil to be supplied to the first or second cylinder chamber 116, 120 is raised in the pump mechanism 18, then the tiltable member 102 is tilted about the support point of the unillustrated pin, and the angle of inclination of the tiltable member 102 is substantially horizontal. Accordingly, the supply of the pressure oil from the pressure oil-sucking/discharging mechanism 16 to the first or second cylinder chamber 116, 120 is stopped. As a result, the pressure fluctuation is reduced in the pump mechanism 18, and the pressure oil can be smoothly supplied. Thus, it is possible to smoothly and efficiently transmit the rotary driving force of the rotary driving source 62 to the pump mechanism 18.

Next, a clamp apparatus 200 according to another embodiment of the present invention is shown in FIGS. 7 to 10. The same constituent elements that are identical to those of the clamp apparatus 10 according to the embodiment described above are designated by the same reference numerals, and detailed explanation thereof will be omitted.

The clamp apparatus 200 according to another embodiment has a DC power source unit (internal DC power source) 221 which is a fuel cell and which is integrally assembled to the side of the pump mechanism 18, positioned opposite with regard to the body 12. An interface unit 225 is provided on the DC power source unit 221. A control signal is supplied through the interface unit 225, and is fed to the rotary driving source 62 via a lead wire 223. The rotary driving source 62 is controlled, for example, by the control signal from an external apparatus (not shown) such as a controller.

The DC power source unit 221 is, for example, a solid polymer type fuel cell comprising electrolyte/electrode structural elements each of which includes an anode and a cathode provided on both sides of an electrolyte membrane composed of a polymer ion exchange membrane (cation exchange membrane). The electrolyte/electrode structural element is interposed by separators. Such a fuel cell is usually used as a fuel cell stack constructed by stacking predetermined numbers of the unillustrated electrolyte/electrode structural elements and the separators.

In the DC power source unit 221, a fuel gas, for example, a gas mainly containing hydrogen is supplied to the anode. Hydrogen contained in the fuel gas is ionized on the electrode catalyst to move toward the cathode via the electrolyte. The electrons generated during this process are extracted by an unillustrated external circuit, and utilized as DC electric energy.

An oxygen-containing gas, for example, a gas mainly containing oxygen or air is supplied to the cathode. Therefore, the hydrogen ion, the electron, and the oxygen are reacted with each other on the cathode to produce water. The water is utilized, for example, to humidify the fuel gas or cool the fuel cell.

In the clamp apparatus 200 according to another embodiment, the DC power source unit 221 of the fuel cell is integrally assembled to the body 12. Accordingly, it is unnecessary to install the external power source in an environment of use, or it is unnecessary to charge a rechargeable battery. Further, any external wiring is unnecessary for electrically connecting the external power source and the rotary driving source 62.

The other functions and effects of the clamp apparatus 200 are the same as those of the clamp apparatus 10, and detailed explanation thereof is omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A clamp apparatus for gripping a workpiece by a rotatable clamp arm, comprising:

a main body;

a rotary driving section which has a rotary driving source that is rotated in accordance with an electric signal;

a pump mechanism which includes a pressure oil-sucking/discharging mechanism that sucks/discharges pressure oil by a rotary driving force of said rotary driving source;

a cylinder mechanism provided with a piston, said piston being displaceable in an axial direction when pressed by said pressure oil fed from said pump mechanism;

a retaining mechanism which retains said pressure oil; and a toggle link mechanism which converts rectilinear motion of said piston driven by said cylinder mechanism into a rotary motion of said clamp arm, said rotary driving section, said pump mechanism, said cylinder mechanism, and said retaining mechanism being integrally assembled to said main body.

2. The clamp apparatus according to claim 1, wherein said pump mechanism includes a rotary shaft which is connected to a drive shaft of said rotary driving source, a cylinder block which is fitted to an intermediate portion of said rotary shaft and which is rotatable together with said rotary shaft, and a plurality of pump pistons which are slidable along holes of said cylinder block.

3. The clamp apparatus according to claim 2, wherein said pump mechanism includes a tiltable member which is formed with a through-hole for surrounding an outer circumferential surface of said rotary shaft in a non-contact state, and a spring member which presses a part of said tiltable member toward said cylinder block, so that amounts of suction and discharge of said pressure oil are adjustable.

4. The clamp apparatus according to claim 1, wherein said main body is provided with a first fluid passage which has one end communicated with a first port of said pump mechanism and the other end communicated with a first cylinder chamber of said cylinder mechanism, and a second fluid passage which has one end communicated with a second port of said pump mechanism and the other end communicated with a second cylinder chamber of said cylinder mechanism.

5. The clamp apparatus according to claim 4, wherein a bypass passage is communicated with said first fluid passage and said second fluid passage, a shuttle valve is arranged in said bypass passage, and said shuttle valve is displaceable depending on a pressure difference between said pressure oil flowing through said first fluid passage and said pressure oil flowing through said second fluid passage.

6. The clamp apparatus according to claim 1, wherein said retaining mechanism comprises an accumulator.

7. The clamp apparatus according to claim 6, wherein said accumulator includes an accumulator piston which is provided displacealy along a hole formed in said main body, and a spring which urges said accumulator piston.

8. The clamp apparatus according to claim 1, further comprising an internal DC power source which is integrally assembled to said main body, wherein said internal DC power source comprises a fuel cell.

9. The clamp apparatus according to claim 8, wherein an interface unit is integrally assembled to said main body for feeding a control signal to said rotary driving source.

* * * * *